(No Model.) 2 Sheets—Sheet 1.

A. B. SEE & W. L. TYLER.
DYNAMO ELECTRIC MACHINE OR ELECTRIC MOTOR.

No. 524,533. Patented Aug. 14, 1894.

Witnesses
C. E. Ashley
H. W. Lloyd

Inventors
Alonzo B. See & Walter L. Tyler.
By their Attorneys
Pope Hill Rogers

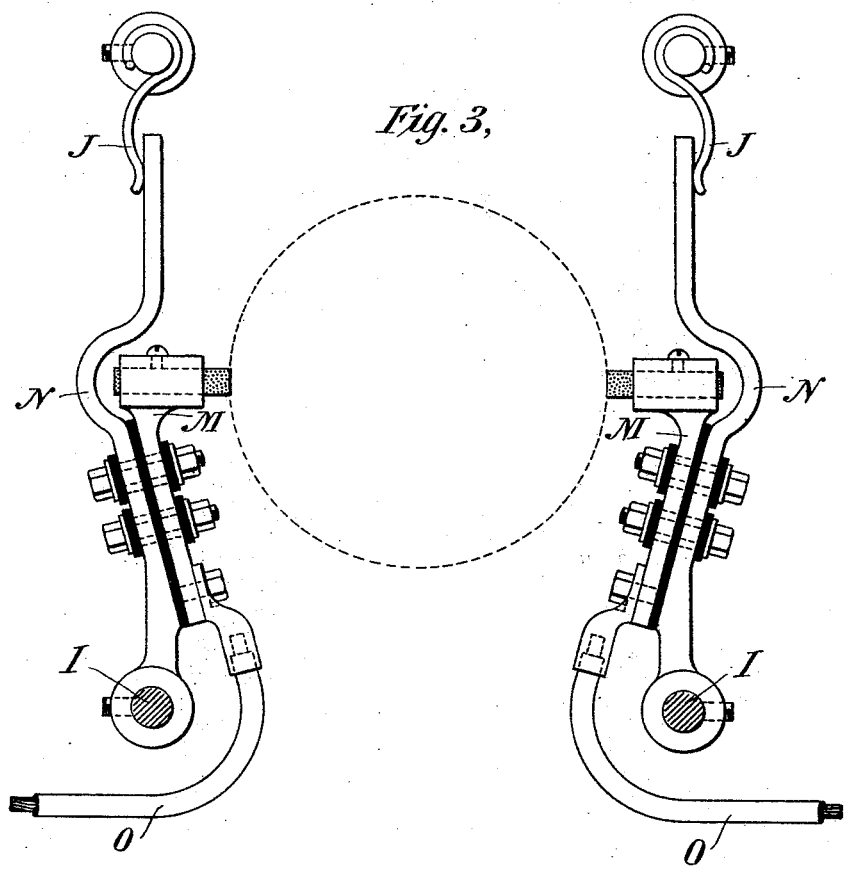

UNITED STATES PATENT OFFICE.

ALONZO B. SEE AND WALTER L. TYLER, OF BROOKLYN, NEW YORK.

DYNAMO-ELECTRIC MACHINE OR ELECTRIC MOTOR.

SPECIFICATION forming part of Letters Patent No. 524,533, dated August 10, 1894.

Application filed May 10, 1894. Serial No. 510,815. (No model.)

*To all whom it may concern:*

Be it known that we, ALONZO B. SEE and WALTER L. TYLER, both citizens of the United States, residing in Brooklyn, in the county of Kings and State of New York, have invented certain new and useful Improvements in Dynamo-Electric Machines or Electric Motors, of which the following is a specification.

This invention relates to improvements in electric motors or generators. It is particularly applicable to motors for operating elevators, and is designed to be economical of floor space, to require a minimum amount of attention, to admit of perfect ventilation and facility of inspection of the windings, and to result in a noiseless operation.

In carrying out the invention we provide a cast iron or steel frame or box open at the top and designed to receive thereon a movable cover, two opposite vertical sides of the box being provided with cores for the field-magnet coils. The box is also provided with an integral journal bearing, standard or support. The vertical walls of the box and the standard or support and the cores of the field-magnet may all be bored at one operation and the armature shaft is supported in bearings mounted upon the standard and one wall of the box. The brushes are supported upon and insulated from an elastically yielding arm in such a way as to prevent chattering and current is led to the brush by a flexible cable provided with a reliable conducting joint.

The several features of novelty of the invention will be more particularly hereinafter described, and will be definitely pointed out in the claims appended to this specification.

Figure 1:
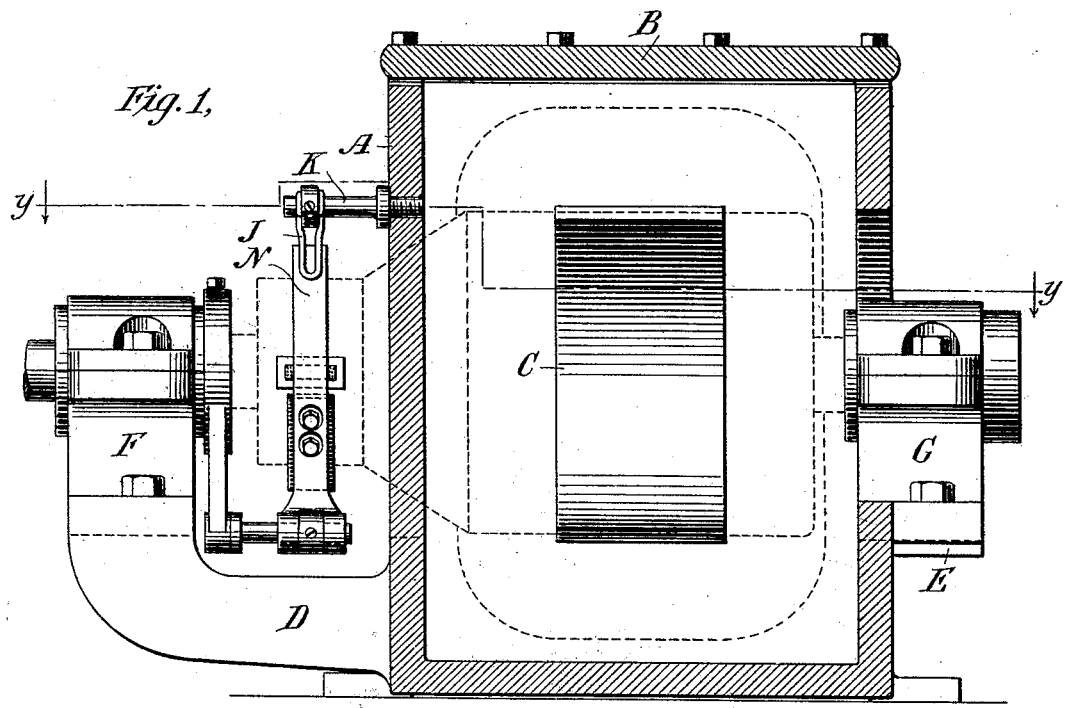
Figure 2:
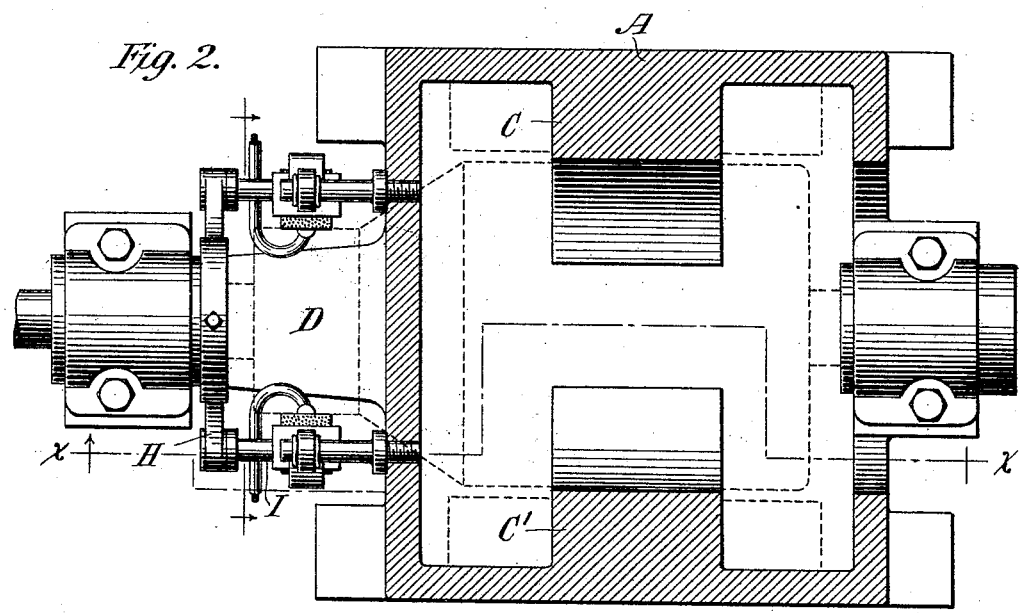

In the accompanying drawings, which illustrate the invention, Figure 1 is a vertical section on the plane indicated by the line *x—x* of Fig. 2 of a motor embodying our improvements, part of the motor being shown in elevation. Fig. 2 is a horizontal section on a plane indicated by the line *y—y* of Fig. 1, looking in the direction indicated by the arrow, parts being shown in plan; and Fig. 3 is a side elevation of the brushes and their supports.

In the drawings A represents a cast iron box closed on the four vertical and bottom sides and open on top. The box is provided with a lid or cover B bolted thereto to admit of convenient removal, when the assemblage of the field-magnet coils or an examination of the windings is needed.

C, C′ represent the field-magnet cores cast integral with the box and placed in the vertical walls thereof. Integral with the body of the box are standards or supports D, E, the former of which projects away from the body of the frame a sufficient distance to permit of the commutator and brush equipment being placed between it and the side of the motor. These standards may be turned in the lathe at the same operation with the field-magnet cores C, C′. The standards are placed beneath the opening formed in the frame for the armature so as to form a vertical support for the latter, and bearings F, G for the armature shaft are secured in any suitable manner to the standards. By this construction a perfect alignment of the armature with respect to the field-magnet cores is maintained and great facility of removal of the armature when repairs are required is provided. It will be seen there being only one supporting standard below the armature that the latter may be withdrawn endwise from the body of the motor.

The support for the commutator brushes is mounted upon a suitable rocker frame H, I, and its free end is pressed by a spring J mounted upon a stud bolt or pin K mounted in the vertical wall of the frame.

The commutator brushes are carried in suitable guide pieces M insulated from the supports N and directly connected with the switchboard of a source of current supplied by flexible conductors O. By this organization the commutator brushes are fed end on to the commutator upon a radius of considerable length and do not change their position by reason of wear. By reason of the spring J bearing upon the free end of the support N the chattering so common with commutator brushes is thoroughly eliminated.

It will be seen that with a construction of the character described, good ventilation is provided for the windings, facility of assemblage and repairs is afforded, and a compact organization is provided. In putting the field-magnet coils in position the cover B is removed and the field-magnet coils are dropped over the cores C, C' and secured in place.

Having thus described our invention, what we claim as new, and desire to secure by Letters Patent, is—

1. A dynamo electric machine or electric motor provided with a box-shaped field-magnet frame having interiorly projecting field-magnet cores, a removable cover on one side of the frame, lateral openings to permit the introduction and withdrawal of the armature, and standards for the armature bearings below said openings, for the purpose described.

2. A dynamo electric machine or electric motor having its brushes mounted upon elastically yielding supports and insulated therefrom, and flexible conductors leading from the brushes.

ALONZO B. SEE.
WALTER L. TYLER.

Witnesses:
THOS. L. HALLISTER,
FRED B. COREY.